United States Patent
Al-Khayat et al.

(10) Patent No.: US 7,109,629 B2
(45) Date of Patent: Sep. 19, 2006

(54) ROTOR DISC FOR AN ELECTRICAL MACHINE AND A RETAINER

(75) Inventors: Nazar Al-Khayat, Rutland (GB); Stephen Frederick Allen, Stamford (GB); Cleveland Mills, Bourne (GB); Jeremy Owen Dowdall, Rutland (GB); Christopher Paul Maddison, Deeping St. James (GB); Martin Nicholls, Stamford (GB)

(73) Assignee: Newage International Limited, Stamford (GB)

( * ) Notice: Subject to any disclaimer, the term of this patent is extended or adjusted under 35 U.S.C. 154(b) by 0 days.

(21) Appl. No.: 10/899,860

(22) Filed: Jul. 26, 2004

(65) Prior Publication Data

US 2005/0121972 A1    Jun. 9, 2005

Related U.S. Application Data

(63) Continuation-in-part of application No. 10/250,961, filed on Jul. 9, 2003.

(30) Foreign Application Priority Data

Jul. 28, 2003   (GB)   ................... 0317633.6

(51) Int. Cl.
*H02K 1/22* (2006.01)

(52) U.S. Cl. ..................... 310/261; 310/266

(58) Field of Classification Search ............... 310/261, 310/266, 268, 156.12, 156.32, 156.33, 91
See application file for complete search history.

(56) References Cited

U.S. PATENT DOCUMENTS

| | | | |
|---|---|---|---|
| 3,320,453 A |   | 5/1967 | Kober |
| 4,167,692 A | * | 9/1979 | Sekiya et al. ............... 318/138 |
| 4,451,749 A | * | 5/1984 | Kanayama et al. ........... 310/62 |
| 4,578,610 A | * | 3/1986 | Kliman et al. ......... 310/156.35 |
| 4,864,175 A |   | 9/1989 | Rossi |
| 5,334,898 A | * | 8/1994 | Skybyk ...................... 310/268 |
| 5,831,365 A |   | 11/1998 | Keim et al. |
| 6,037,696 A | * | 3/2000 | Sromin et al. .............. 310/268 |

FOREIGN PATENT DOCUMENTS

WO    WO 02/056443    7/2002

* cited by examiner

*Primary Examiner*—Darren Schuberg
*Assistant Examiner*—Nguyen Hanh
(74) *Attorney, Agent, or Firm*—Sawyer Law Group LLP

(57) ABSTRACT

A rotor disc for an electrical machine is disclosed. The rotor disc comprises a series of magnetisable members arranged in a circumferential series on a surface thereof and against peripheral retaining structure of the disc. The disc also includes a retainer fixable to the surface and arranged for assisting in retaining the members at least axially on the surface when so fixed. The retainer is arranged to abut at least one of a substantially circumferentially and substantially tangentially extending, radially inner part of each member and thereby to provide the axial retention.

21 Claims, 4 Drawing Sheets

ROTOR DISC FOR AN ELECTRICAL MACHINE AND A RETAINER

RELATED APPLICATIONS

This application is a continuation in part (CIP) of U.S. patent application Ser. No. 10/250,961, filed Jul. 9, 2003, entitled "A Method of Fixing Unmagnetised, Magnetisable Members to a Rotor Disk and a Rotor Disc."

FIELD OF THE INVENTION

The present invention relates to a rotor disc for an electrical machine and to a retainer for such a rotor disc. The present invention also relates to a retainer for a rotor disc for an electrical machine.

BACKGROUND

The use of rare-earth permanent magnets to provide the excitation field in alternating current (AC) machines is known. However, the handling and mounting of members of rare-earth material is not straightforward. Such members are brittle and are therefore easily damaged. Consequently, it is difficult to mount the members onto a rotor or a stator of an AC machine in such a way that they can withstand the large forces exerted on them during operation, without sustaining damage.

U.S. Pat. No. 6,037,696 discloses a rotor for use in an electrical machine wherein magnetized members are mounted on a surface of a disc-shaped central sheet. The rotor disc of U.S. Pat. No. 6,037,696 includes a braced hub in the form of a spider that is for restraining the central sheet and promoting rotor rigidity. The magnetized members are constrained axially and tangentially on the central sheet by being bonded face-to-face with the surface thereof. The magnetized members are constrained radially on the central sheet by the provision of a circumferential lip that is formed integrally with the central sheet. Further radial constraint is provided by bonding a radially innermost edge of each magnetized member to the braced hub.

It is an object of this invention to address this problem.

SUMMARY OF THE INVENTION

A rotor disc for an electrical machine is disclosed. The rotor disc comprises a series of magnetizable members arranged in a circumferential series on a surface thereof and against peripheral retaining structure of the disc. The disc also includes a retainer fixable to the surface and arranged for assisting in retaining the members at least axially on the surface when so fixed. The retainer is arranged to abut at least one of a substantially circumferentially and substantially tangentially extending, radially inner part of each member and thereby to provide the axial retention.

A secondary retainer may be provided for fixing the members to the surface. For example the members may also be fixed to the surface by an adhesive.

The retainer may also be arranged to abut the members so as to retain the members tangentially. Tangential retention may be provided by the retainer being arranged to abut substantially radially-extending sides of the members.

Preferably the retainer and the members are arranged to have mutually abutting surfaces that are oblique to the surface of the disc. Some or all of the mutually abutting surfaces may extend substantially circumferentially, or substantially tangentially, such that the axial retention is provided by abutment therebetween. Preferably, the surface of each member that is a mutually abutting surface is a radially innermost end of the member. This is advantageous in urging each member both axially against the surface of the disc and radially against the peripheral retaining structure of the disc, thereby providing both axial and radial retention of at least the radially innermost part of the member. In a preferred embodiment of this invention, the mutually abutting surfaces make an angle of between about 70 and 80 degrees with the surface of the disc. Most preferably, the angle is about 75 degrees.

At least some of the mutually-abutting surfaces may extend substantially radially, such that the radial retention, and additional axial retention, is provided by abutment therebetween.

The retainer may be arranged such that it abuts a surface of each member that is opposite to a surface thereof that is against the surface of the disc, the retainer thereby providing the axial retention.

The retainer may include a supporting part and an abutment part, the supporting part being for fixing to the surface of the disc and the abutment part for fixing to the supporting part and for abutting the members. The abutment part may be of a stronger material than the supporting part. Preferably the abutment part is of a non-ferrous metal, such as aluminium and the supporting part is of a plastic material, such as nylon. Preferably the abutment part is arranged such that, when fixed to the supporting part, it presents a, or a respective, surface for the said oblique mutual abutment with the or each of the members.

The abutment part preferably includes a plurality of wedge members for fitting to the supporting part such that fixing the supporting part to the disc results in each wedge member presenting a substantially tangential surface that is oblique to the surface of the disc to a respective one of the members. Preferably the members are arranged with a radially inner and cooperating substantially tangential surface that is oblique to the surface of the disc and that cooperates with the oblique surface of each wedge member to result in the axial retention of the member when the supporting part is fixed to the disc.

The abutment part may include another surface or surfaces, substantially opposite the first and for abutment against the supporting part or against radially inner structure of the disc. The other surface of the abutment part may also be oblique to the surface of the disc and such that fixing the abutment part to the supporting part, and/or the supporting part to the disc, causes the abutment part to be urged against the member. The supporting part or the radially inner structure of the disc may be provided with a cooperating surface or surfaces that are oblique to the surface of the disc and for cooperating with the other surface of the abutment part.

In a preferred embodiment the supporting part includes a spider, the spider having an inner annulus with a plurality of arms projecting radially therefrom. The spider is preferably for mounting coaxially with the disc such that each arm projects between and abuts each of a respective juxtaposed pair of the members, thereby providing the tangential retention. The abutment part preferably includes a plurality of wedge members for fitting to the annulus of the spider such that fixing the spider to the disc results in each wedge member presenting a substantially tangential surface that is oblique to the surface of the disc to a respective one of the members. Preferably the members are arranged with a substantially tangential surface that is oblique to the surface of the disc and that cooperates with the oblique surface of each wedge member to result in the axial retention of the member when the spider is fixed to the disc.

The magnetisable members are preferably rare earth magnets, such as those formed from neodymium-iron-boron.

DETAILED DESCRIPTION OF THE INVENTION

Figure 1:
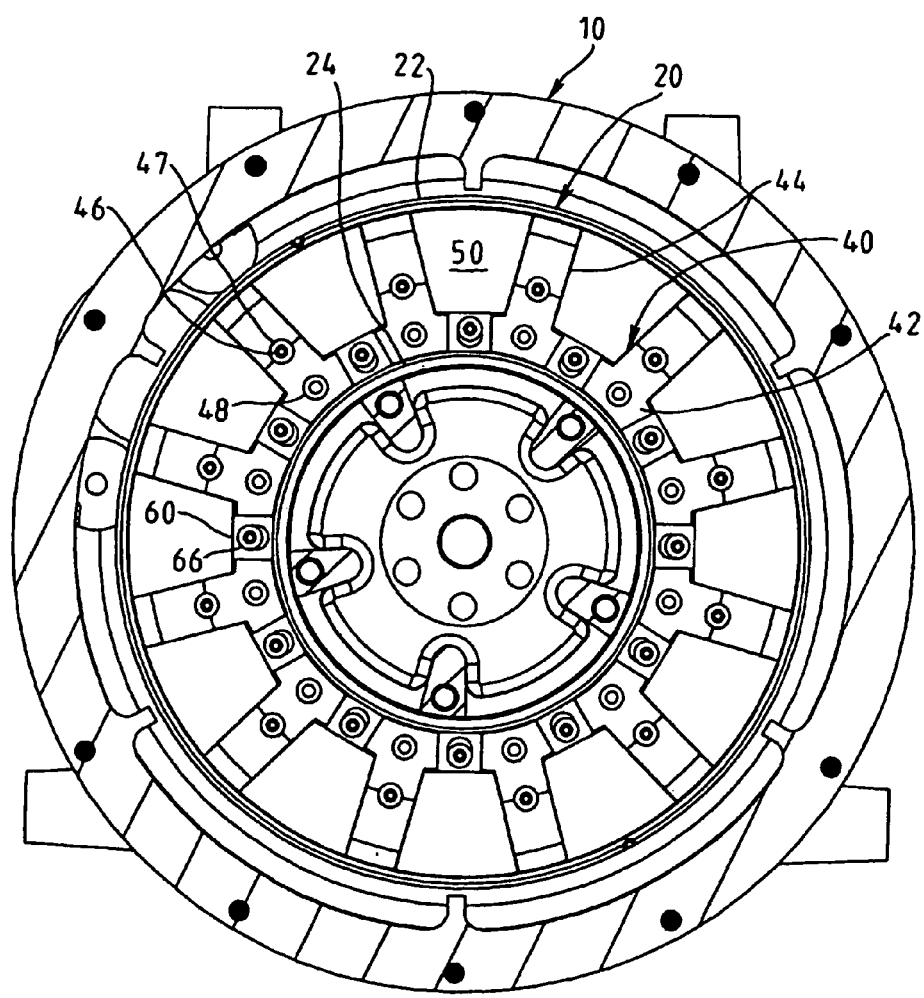
FIG. 1 is a sectional view through an alternator showing a plan view of a rotor disc of the alternator.

The present invention relates to a rotor disc for an electrical machine and to a retainer for such a rotor disc. The present invention also relates to a retainer for a rotor disc for an electrical machine. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

U.S. patent application Ser. No. 10/250,961, filed Jul. 9, 2003, entitled "A Method of Fixing Unmagnetised Magnetisable Members to a Rotor Disc and a Rotor Disc" discloses a rotor disc for an AC electrical machine having magnetisable members fixed against a surface thereof in a circumferential series. The members are fixed against the surface by way of a spider that is attached to the surface and that has arms that are arranged to abut the members when the spider is so attached. The spider is arranged such that each arm projects radially between a respective juxtaposed pair of the members. Each arm is shaped so as to be wedge-shaped, the narrower part of the wedge being adjacent the surface and the wider part of the wedge being away from the surface. The members are also wedge-shaped, but taper in the opposite direction to that of the spider arms so as to form cooperating wedges with the arms when the spider is in abutment against the members. This results in the members being retained in position on the surface of the disc both tangentially and radially.

Although the arrangement disclosed in U.S. patent application Ser. No. 10/250,961, filed Jul. 9, 2003, entitled "A Method of Fixing Unmagnetised Magnetisable Members to a Rotor Disc and a Rotor Disc" is advantageous in retaining some sizes of magnets in position during operation, it has been found that this arrangement is not adequate for retaining larger magnets that may be used on larger electrical machines. In such circumstances, it has been found that such larger magnets tend to come away from the surface of the disc against which it is intended they be held by the spider.

It has been found that, in operation, larger magnets fixed to a rotor disc using a known technique, such as that disclosed in U.S. patent application Ser. No. 10/250,961, filed Jul. 9, 2003, entitled "A Method of Fixing Unmagnetised Magnetisable Members to a Rotor Disc and a Rotor Disc" can become at least partly detached from the disc. Surprisingly, it has been realized that this is due to a tendency for the members to rotate about an axis tangential to the surface of the disc such that their radially inner ends lift above the surface in an axial direction, with respect to the axis of the disc. This is particularly the case with larger members. The present invention is advantageous in that, by abutting a circumferentially or tangentially extending and radially inner part of each member, such as a radially inner and end face, this tendency can be most easily resisted. To describe the present invention in more detail refer now to the following discussion in conjunction with the accompanying figures.

Figure 2:
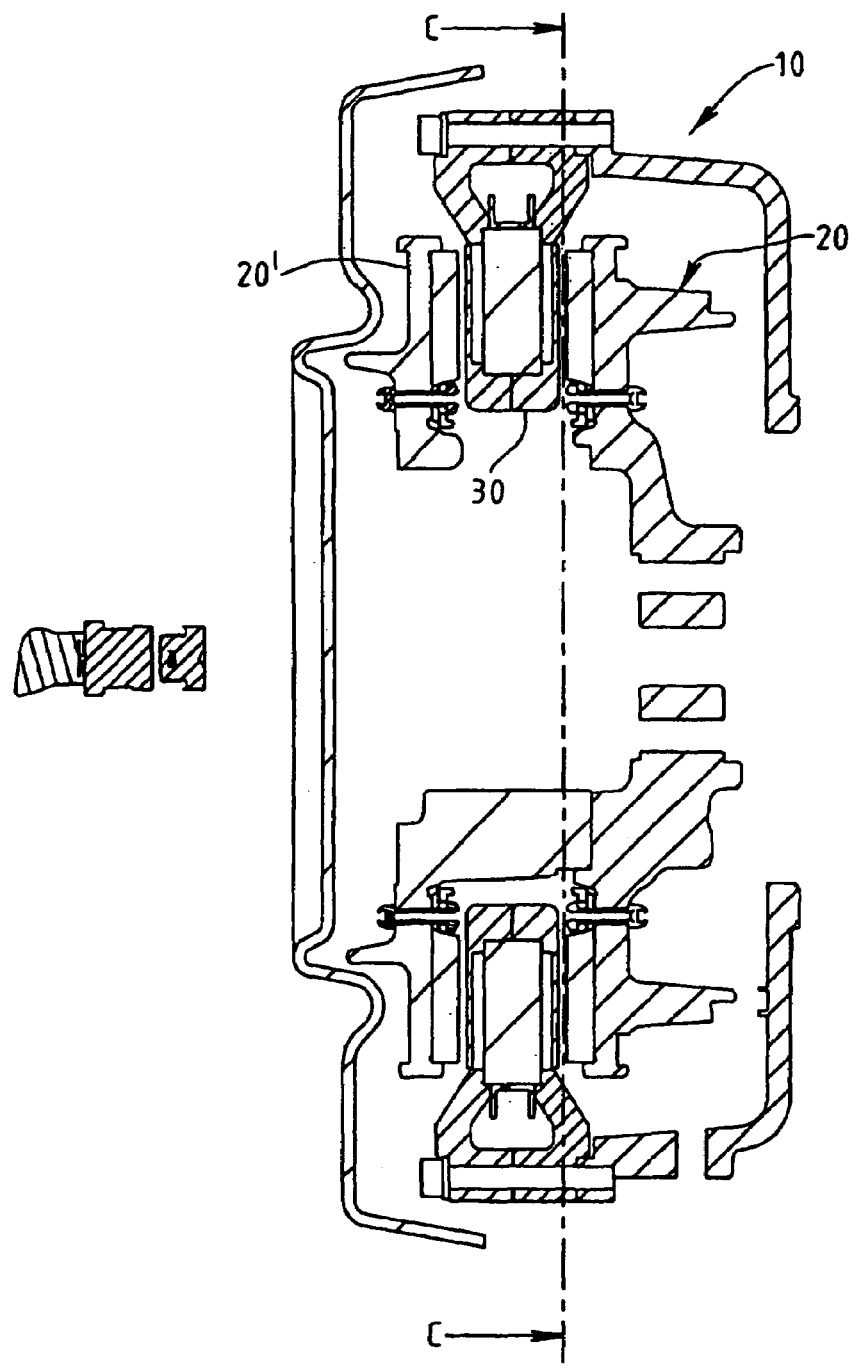
FIG. 2 is sectional view though the alternator, the section being through a radial plane of the rotor disc.

FIG. 1 shows a rotor disc 20 of a permanent magnet, axial flux alternator 10. The alternator 10 is of the type that has a toroidal stator sandwiched between a pair of co-axial rotor discs, of which the rotor disc 20 is one. FIG. 2 is a cross sectional view of the alternator 10 and shows the stator 30, the one rotor disc 20 and the other rotor disc 20'.

With reference to FIG. 1, the rotor disc 20 is an annular disc formed of a ferrous material, such as electromagnetic steel. The disc 20 is formed with peripheral retaining structure in the form of a continuous peripheral lip 22 that projects from the one of its surfaces that is for placing adjacent the stator 30. The disc 20 is also formed with radially inner structure in the form of a continuous radially inner lip 24 that projects from the same surface of the disc 20.

As can also be seen from FIG. 1, the rotor disc 20 includes twelve magnets 50 positioned on the surface of the disc 20, and a spider 40 fixed to that surface.

The magnets 50 are rare earth permanent magnets formed of neodymium-iron-boron. The magnets 50 are substantially trapezium-shaped plates, having a long side substantially parallel to a short side with two mutually-oblique sides extending therebetween. The long side is, however, shaped so as to be arcuate and of a radius that is substantially the same as that of the inner diameter of the peripheral lip 22. Thus, in plan-form, each magnet 50 resembles a sector, but with a triangular tip portion removed. The magnets 50 are circumferentially distributed about the disc 20 with a constant pitch angle and orientated such that each has its arcuate side adjacent the peripheral lip 22.

Figure 3B:
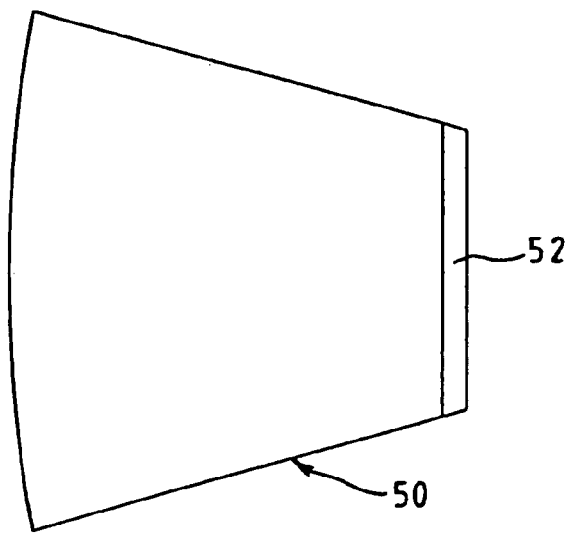
FIG. 3B is a plan view of the magnet.
Figure 3A:
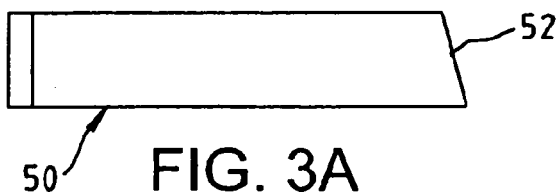
FIG. 3A is a side elevation of a magnet for fitting to the rotor disc.

When positioned on the surface of the disc 20, all of the sides of each magnet 50 project perpendicularly from the surface, with the exception of the radially innermost side, shown at 52 on FIGS. 3A and 3B. With reference to these two figures, the radially innermost side 52, which extends tangentially when in position on the disc 20, is inclined to the perpendicular from the surface of the disc so as to be oblique thereto. The radially innermost side 52 forms an angle of 15 degrees with the perpendicular and such that the magnet face that is adjacent the disc surface projects further from the peripheral lip 22 than does the magnet face that is spaced from the surface. Thus, each magnet 50 has three sides which may be termed "perpendicular" and one side, the radially innermost side 52, which may be termed "oblique".

Each magnet is fixed in position on the surface of the disc 20 by an adhesive.

The spider 40 is for use in retaining the magnets 50 in position on the rotor disc 20. The spider 40 is formed from nylon and is shaped so as to have an inner annular portion 42, with a series of circumferentially-distributed arms 44 projecting radially outwards therefrom, as can be seen more clearly from FIG. 4. With reference to FIG. 3, the spider 40 is mounted to the surface of the disc 20 such that the inner diameter of the annular portion 42 of the spider 40 lies around and adjacent the radially inner lip 24. The arms 44 of the spider are for interdigitating with the magnets 50 and so the spider 40 is orientated such that each juxtaposed pair of the magnets 50 have a respective arm 44 therebetween. The sides of each of the spider arms 44 are perpendicular to the surface of the disc 20 and the width of each arm 44 is such that it abuts the adjacent, perpendicular and generally radial side of each of the respective juxtaposed pair of magnets 50.

Figure 4:
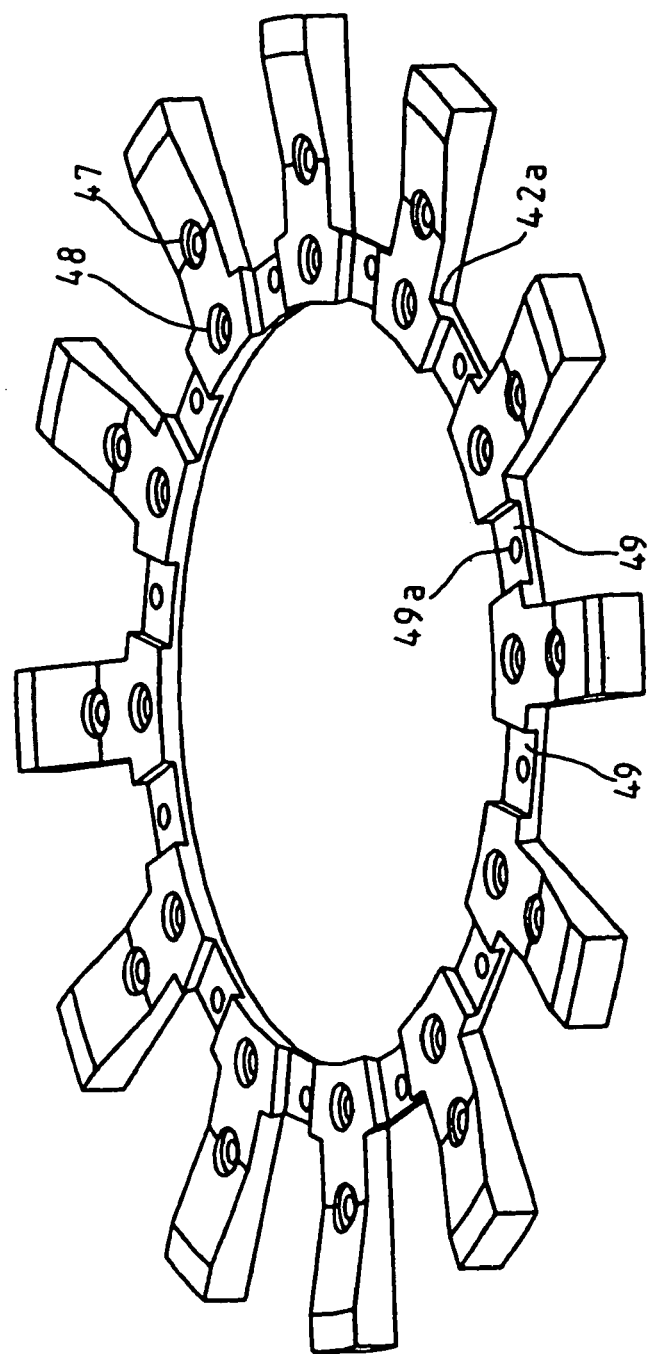
FIG. 4 is a perspective view of a spider for fitting to the rotor disc.

FIG. 4 allows more of the detail of the shape of the spider 40 to be understood. With reference to FIG. 4, the inner annulus 42 of the spider 40 has radially outer sides 42a that, in contrast to the sides of the arms 44, are not perpendicular to the surface of the disc 20 when the spider 40 is mounted thereon. Instead, the radially outer sides 42a are oblique to the surface so as to cooperate with and be in face-to-face abutment with the oblique radially inner sides 52 of the magnets 50. Thus, the radially outer sides 42a of the spider 40 also make an angle of 15 degrees with a perpendicular to the disc surface. The abutment is such that the magnets 50 are urged against the peripheral lip 22 of the disc 20.

The spider is fixed in position by the provision of a number of rivets, shown at 46 in FIG. 1, each of which passes through a respective rivet hole, shown at 47 in FIGS. 1 and 4, formed through each arm 44 of the spider 40 and through a cooperating hole (not shown) formed through the rotor disc 20. The spider 40 also includes a series of air holes 48 formed through the annulus 42 thereof, each in-line with a respective one of the arms 44. Each of these air holes 48 is co-axial with a respective cooperating hole (not shown) in the rotor disc 20 and is for admitting cooling air therethrough during operation of the alternator 10.

With reference to FIG. 4, the annulus 42 of the spider 40 also includes a series of cut-outs 49. Each cut-out 49 is a radial channel through the annulus 42, such that the annulus 42 is of reduced thickness in the region of each cut-out 49. Each cut-out 49 is formed into the surface of the spider 40 that is not for placing against the surface of the disc 20. A respective cut-out 49 is formed mid-way between each juxtaposed pair of the arms 44. A further rivet hole 49a is formed though the base of the channel that is defined by each cut-out 49, that is to say: through material of the annulus 42, in the region of each cut-out 49.

With reference to FIG. 1, the disc 20 also includes a series of wedge members in the form of inserts 60. Each insert 60 is a block, formed from aluminium, that is shaped and arranged to be a sliding fit, in a radial direction, in one of the cut-outs 49. All of the sides of each insert 60 are at right angles to one another or parallel to one another, apart from one face 62 which is oblique. Each insert 60 is arranged such that, when fitted in a cut-out 49, the oblique face 62 can be positioned radially outwards, with respect to the annulus 42 of the spider 40. In such a position, the oblique face 49 of each insert 60 is a co-planar continuation of a respective oblique radially-outer side 42a of the annulus 42. Thus, the oblique side 62 of each insert 60 is also in face-to-face abutment with the oblique face 52 of a respective one of the magnets 50.

Figure 5A:
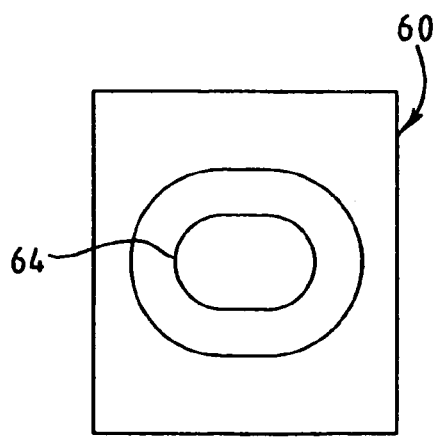
FIG. 5A is a plan view of an insert for fitting to the spider.
Figure 5B:
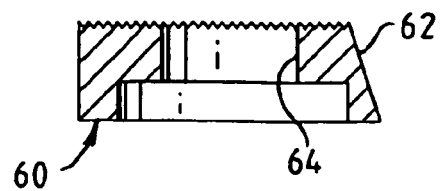
FIG. 5B is a sectional view through the insert.

Each insert 60 includes a rivet-receiving fixing hole 64 for fixing the insert 60 to the annulus 42 of the spider 40 and to the rotor disc 20. An insert-retaining rivet, shown at 66 in FIG. 1, is riveted through the fixing hole 64 of each insert 60 and through a respective one of the further holes 49a in the annulus 42 and through a respective cooperating hole formed through the rotor disc 20. With reference to FIGS. 5A and 5B, the fixing holes 64 are counter-sunk to accommodate the rivet head portions within external contours of the insert 60. The fixing holes 64, including the counter sunk portions thereof, are elongated in a direction that is radial with respect to the annulus 42 when the inserts 60 are fitted thereto. This is to allow some radial variation of the position of each insert 60 relative to the magnets 50, thereby ensuring that each insert 60 can be placed in abutment with its respective magnet 50, before that insert 60 is riveted into position on the annulus 42 and the rotor disc 20. As shown in FIG. 5B, the underside of each insert 60, that is for contacting the annulus 42, is formed with grooves extending in a direction that is substantially tangential when the insert 60 is fitted to the annulus 42. The grooves are formed in a knurling operation. The provision of the grooves increases friction between the inserts 60 and the annulus 42, thereby promoting fixation of the former relative to the latter.

The abutment between two inserts 60 and their respective magnets 50, and the riveting of those two inserts 60 to the annulus 42 of the spider and the rotor disc 20 is shown in the section view of the alternator 10 of FIG. 2.

In operation of the alternator 10, the rotor disc 20 is rotated at high speed. The magnets 50 are therefore subjected (from the frame of reference of the rotor disc) to a radially outwards centrifugal force during rotation, to tangential forces when speeding up and slowing down and to axial forces as a result of electromagnetic interaction with surrounding structure. Radial retention is provided by the peripheral lip 22 in reaction to the centrifugal force, tangential retention is provided by the arms 44 of the spider 40 in reaction to the tangential forces, and axial retention, at least of the radially innermost part of each magnet 50, is provided by the inserts 60, and specifically by the reaction of the oblique faces 62 thereof against the cooperating oblique sides 52 of the magnets 50. By axially retaining at least the radially innermost part of each magnet 50, the tendency of each magnet 50 to rotate about an axis tangential to the disc such that their radially innermost ends lift from the surface of the disc 20 is resisted. Thus, the magnets are retained in position during operation.

In a first alternative embodiment of this invention which is not illustrated, the spider 40 of the previously-described embodiment is modified. The modified spider is modified such that each cut-out therethrough forms a blind channel in the annulus that terminates in a radially inner wall. Each radially inner wall serves as an abutment against which the respective insert may abut when it abuts against the respective magnet. In other words, the insert acts as a wedge between the wall and the magnet.

In a second alternative embodiment of this invention which is also not illustrated, the spider is the same as that 40 described above with reference to the drawings, but the inserts are modified. Each modified insert is elongated in a radial direction and has a radially inner face that mirrors its radially outer face in being oblique to a perpendicular to the surface of disc. Each insert is arranged such that, when its radially outer face abuts the respective magnet, its radially inner face abuts the radially inner lip of the disc. Thus, and again, the inserts act as wedges; but this time they act as wedges between the radially inner lip and the magnets. It is envisaged that a radially outer surface of the radially inner lip may also be oblique to a perpendicular to the surface of the disc and so as to cooperate with the oblique and radially inner face of each modified insert.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A rotor disc for an electrical machine, the rotor disc comprising:
a series of magnetisable members arranged in a circumferential series on a surface thereof and abutting against the periphery of the disc; and
a retainer fixable to the surface and arranged for assisting in retaining the members at least axially on the surface when so fixed, wherein the retainer is arranged to be flexible in a radially adjustable position so as to abut at least one of a substantially circumferentially and substantially tangentially extending, radially inner part of each member and thereby to provide the axial retention and to urge the member against the periphery of the disc.

2. The rotor disc according to claim 1, wherein the retainer is arranged to abut the members so as to retain the members tangentially.

3. The rotor disc according to claim 2, wherein said tangential retention is provided by the retainer being arranged to abut substantially radially-extending sides of the members.

4. The rotor disc according to claim 1, wherein the retainer and the members are arranged to have mutually abutting surfaces that are substantially oblique to the surface of the disc.

5. The rotor disc according to claim 4, wherein some or all of the mutually abutting surfaces extend one of substantially circumferentially and substantially tangentially, such that the axial retention is provided by abutment therebetween.

6. The rotor disc according to claim 4, wherein the surface of each member that is a mutually abutting surface is a radially innermost end of the member.

7. The rotor disc according to claim 4, wherein the mutually abutting surfaces make an angle of between about 70 and 80 degrees with the surface of the disc.

8. The rotor disc according to claim 4, wherein at least some of the mutually-abutting surfaces extend substantially radially, such that the radial retention, and additional axial retention, is at least partly provided by abutment therebetween.

9. The rotor disc according to claim 1, wherein the retainer is arranged so as to abut a surface of each member that is opposite to a surface thereof that is against the surface of the disc, the retainer thereby at least partially providing the axial retention.

10. The rotor disc according to claim 1, wherein the retainer includes a supporting part and abutment part, the supporting part being for fixing to the surface of the disc and the abutment part for fixing to the supporting part and for abutting the members.

11. The rotor disc according to claim 10, wherein the abutment part is of a stronger material than the supporting part.

12. The rotor disc according to claim 10, wherein the abutment part is arranged such that, when fixed to the supporting part, it presents a, or a respective, surface for the said oblique mutual abutment with the or each of the members.

13. The rotor disc assembly according to claim 10, wherein the abutment part includes a plurality of wedge members for fitting to the supporting part such that fixing the supporting part to the disc results in each wedge member presenting a substantially tangential surface that is oblique to the surface of the disc to a respective one of the members.

14. The rotor disc assembly according to claim 13, wherein the members are arranged with a radially inner and cooperating substantially tangential surface that is oblique to the surface of the disc and that cooperates with the oblique surface of each wedge member to result in the axial retention of the member when the supporting part is fixed to the disc.

15. The rotor disc assembly according to claim 12, wherein the abutment part includes another surface or surfaces, substantially opposite the first said surface of the abutment part, the other surface or surfaces being for abutment against at least one of the supporting part and radially inner structure of the disc.

16. The rotor disc according to claim 15, wherein the said other surface of the abutment part is oblique to the surface of the disc and such that relative fixing of the abutment part to the supporting part causes the abutment part to be urged against the member.

17. The rotor disc according to claim 15, wherein at least one of the supporting part and the radially inner structure of the disc is provided with at least one cooperating surface that is oblique to the surface of the disc and for cooperating with the said other surface of the abutment part.

18. The rotor disc according to claim 10, wherein the supporting part includes a spider, the spider having an inner annulus with a plurality of arms projecting radially therefrom, the spider being for mounting coaxially with the disc such that each arm projects between and abuts each of a respective juxtaposed pair of the members, thereby providing the tangential retention.

19. A rotor disc for an electrical machine, the rotor disc comprising:
a series of magnetizable members arranged in a circumferential series on a surface thereof and abutting against the periphery of the disc; and
at least one retainer fixable to the surface and arranged for assisting in retaining the members at least axially on the surface when so fixed, wherein the at least one retainer is arranged to be flexible in a radially adjustable portion so as to abut at least one of a substantially circumferentially and substantially tangentially extending, radially inner part of each member and thereby to provide the axial retention and to urge the member against the periphery of the disc.

20. A rotor disc for an electrical machine, the rotor disc comprising:
a series of magnetisable members arranged in a circumferential series on a surface thereof and abutting against the periphery of the disc; and
at least one retainer fixable to the surface and arranged for assisting in retaining the members at least axially on the surface when so fixed, wherein the at least one retainer is arranged to be flexible in a radially adjustable portion so as to abut at least one of a substantially circumferentially and substantially tangentially extending, radially inner part of each member and thereby to provide the axial retention and to urge the member against the periphery of the disc, wherein the at least one retainer includes at least one supporting part and at least one abutment part, the supporting part being for fixing to the surface of the disc and the abutment part for fixing to the supporting part in the radially adjustable portion and for abutting the members, and wherein the at least one abutment part includes a plurality of wedge members for fitting to the supporting part such that fixing the supporting part to the disc results in each wedge member presenting a substantially tangential surface that is oblique to the surface of the disc to a respective one of the members.

21. A rotor disc for an electrical machine, the rotor disc comprising:

a series of magnetizable members arranged in a circumferential series on a surface thereof and abutting against the periphery of the disc; and a retaining means fixable to the surface and arranged for assisting in retaining the members at least axially on the surface when so fixed, wherein the retaining means are arranged to be flexible in a radially adjustable portion so as to abut at least one of a substantially circumferentially and substantially tangentially extending, radially inner part of each member and thereby to provide the axial retention and to urge the members against the periphery of the disc.

* * * * *